United States Patent Office 3,139,274
Patented June 30, 1964

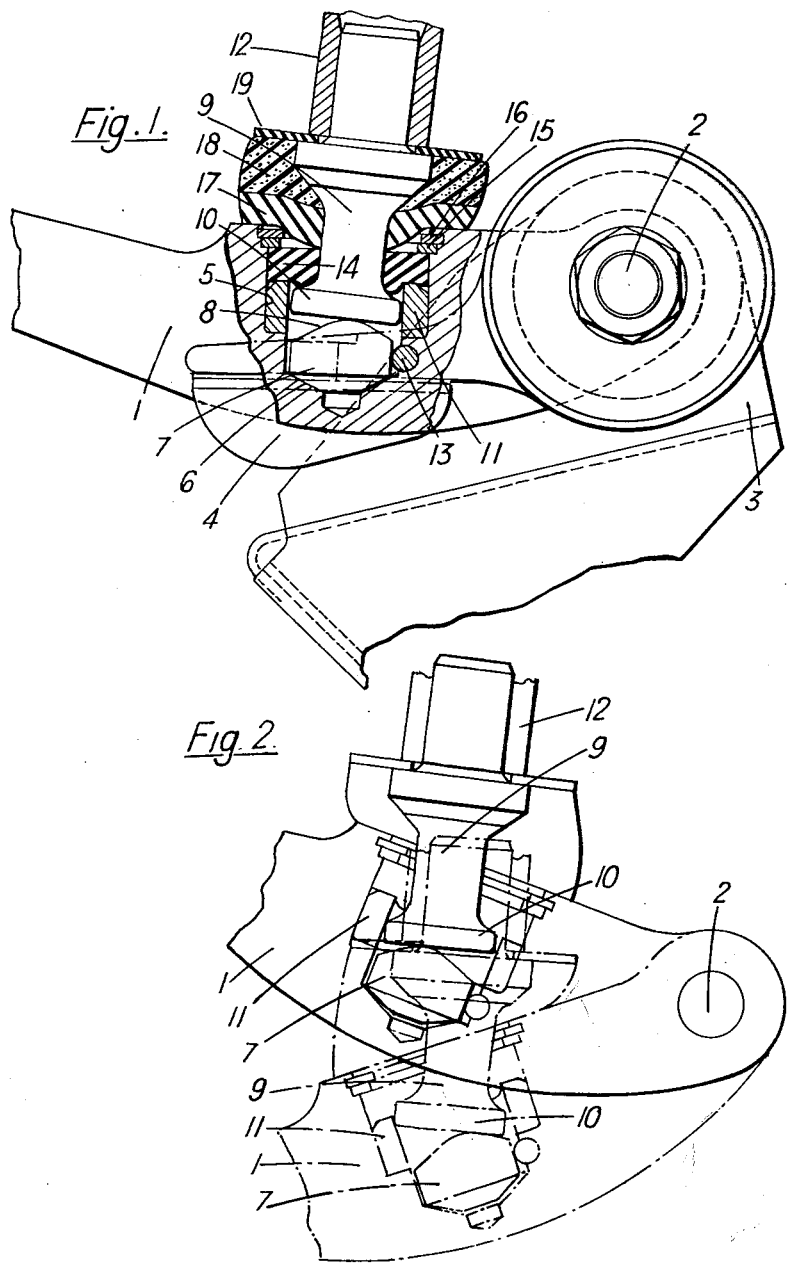

3,139,274
ROLLING-JOINT BEARINGS
Cyril C. G. Hodgkins, Watlington, England, assignor to Morris Motors Limited, Cowley, Oxford, England
Filed Dec. 10, 1962, Ser. No. 243,392
Claims priority, application Great Britain Jan. 24, 1962
3 Claims. (Cl. 267—15)

This invention relates to rolling-joint bearings.

According to the invention an improved rolling-joint bearing comprises a socket in which is seated a cam-like bearing member affording a bearing surface of substantially semi-cylindrical shape with which a plane bearing face on a pivotal thrust member makes rolling contact within a locating bush coaxial with, and held in, the socket; and means locking the bearing member against rotation.

Although capable of being employed whenever a rolling joint is required, the invention has been evolved specifically for application to independent wheel-suspension systems of motor vehicles, of the kind in which a strut, capable of pivotal movements, is interposed between a wheel-suspension control arm and an associated spring or other yieldable suspension device. The latter, for example, might comprise a rubber cone spring as disclosed in Patent No. 2,858,127; or, in the case of a suspension system of the conjugate hydraulic type, it might comprise a hydraulic displacer unit such as that disclosed in Patent No. 3,007,714.

Referring to the accompanying drawings:

FIGURE 1 is a fragmentary elevation, partly in section, illustrating a rolling-joint bearing in accordance with the invention incorporated in a wheel-suspension assembly of a motor vehicle; and FIGURE 2 illustrates diagrammatically the same arrangement in its two extreme positions ("Bump" and "Rebound" respectively).

The illustrated portion of a wheel-suspension assembly of a motor vehicle comprises an upper control arm 1 which is mounted on a horizontal pivot pin 2 supported by an underframe structure 3 of the vehicle. The member 4, which happens to have been included in FIGURE 1, is a rebound buffer.

An upwardly-facing socket 5 is formed in the control arm 1. The base of this socket is shaped to afford a chamfered seat 6 for the correspondingly shaped base of a cam-like bearing member 7 of steel, having a hardened bearing surface 8 of substantially semi-cylindrical shape, which constitutes one member of a rolling joint.

A strut 9, capable of pivotal movements, has at one end a hardened steel foot 10 affording a plane bearing face which makes rolling contact with the cam-like bearing member 7. The arrangement is such that, throughout the range of pivotal movement, the foot 10 of the strut 9 lies within a hardened steel locating bush 11 coaxial with, and held in, the socket 5. The other end of the pivotal strut 9 is attached (for example, by means of a coaxial tubular member 12) to whatever form of yieldable suspension device is employed. For example, it may be attached to the diaphragm of a diaphragm-type hydraulic displacer unit.

The assembly of the improved rolling-joint bearing also includes a locking pin 13, which engages a flat on the bearing member 7, and a retaining pad 14 of rubber surrounding the portion of the pivotal strut 9 adjacent to its foot 10. This retaining pad 14 bears upon the upper edge of the locating bush 11, and is held in place by a retaining ring 15 and a circlip 16. A two-part seal 17, 18, having a retaining washer 19, is provided around the mouth of the bearing socket. The part 17 of the seal is made of expanded rubber of the closed-cell type, which is impervious to grease, and the part 18 is made of sponge rubber (i.e. cellular rubber of the open-cell type) and is united by adhesive to the part 17.

In FIGURE 2 the full lines denote the "Bump" condition of the vehicle wheel-suspension assembly, and the chain-dotted lines the "Rebound" condition.

I claim:

1. A rolling joint comprising a socket defining a chamfered seat, a cam-like bearing member in and stationary with respect to said socket, said bearing member having a substantially part-cylindrical curved bearing surface and a base shaped to conform to said seat, locking means preventing rotation of said bearing member in said socket, a locating bush in and coaxial with said socket, and a pivotal thrust member having a foot provided with a plane bearing surface cooperating with said curved bearing surface, said foot remaining throughout the range of movement of said pivotal thrust member within said locating bush.

2. A rolling-joint bearing as claimed in claim 1 comprising a rubber pad which surrounds the pivotal thrust member and retains the locating bush in place.

3. In combination, a wheel-suspension assembly for a motor vehicle comprising a control arm and the rolling joint as claimed in claim 1, said socket being formed in said control arm.

References Cited in the file of this patent

UNITED STATES PATENTS

| | | |
|---|---|---|
| 1,871,963 | Dill | Aug. 16, 1932 |
| 2,569,823 | Moskovitz | Oct. 2, 1951 |
| 2,635,906 | Graham et al. | Apr. 21, 1953 |
| 2,746,744 | Blattner | May 22, 1956 |
| 2,934,350 | Herbenar | Apr. 26, 1960 |
| 3,004,755 | Moulton | Oct. 17, 1961 |